United States Patent [19]
Cooper et al.

[11] Patent Number: 6,165,384
[45] Date of Patent: *Dec. 26, 2000

[54] FULL SPECTRUM FLUORESCENT DYE COMPOSITION FOR THE OPTIMIZATION OF LEAK DETECTION PROCESSES

[75] Inventors: B. William Cooper, Lloyd Harbor; John T. Duerr, Massapequa Park, both of N.Y.

[73] Assignee: Spectronics Corporation, Westburg, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/137,022

[22] Filed: Aug. 20, 1998

Related U.S. Application Data

[60] Provisional application No. 60/057,110, Aug. 27, 1997.

[51] Int. Cl.[7] .................................................... C09K 11/06
[52] U.S. Cl. ............................ 252/301.19; 252/301.16; 252/68; 252/964
[58] Field of Search .................. 252/301.16, 301.19, 252/964, 68; 73/40.7; 250/3.1, 3.2; 166/337, 250.08; 436/3

[56] References Cited

U.S. PATENT DOCUMENTS

| | | |
|---|---|---|
| Re. 35,370 | 11/1996 | Henry ........................................ 73/40.7 |
| 3,386,920 | 6/1968 | Alburger .............................. 252/301.19 |
| 4,452,720 | 6/1984 | Harada et al. ...................... 252/301.16 |
| 4,758,366 | 7/1988 | Parekh ........................................ 252/68 |
| 5,215,679 | 6/1993 | Cramm et al. ...................... 252/301.35 |
| 5,294,664 | 3/1994 | Morrison, Jr. et al. .................. 524/560 |
| 5,357,782 | 10/1994 | Henry ........................................ 73/40.7 |
| 5,421,192 | 6/1995 | Henry ........................................ 73/40.7 |
| 5,470,502 | 11/1995 | Hahn et al. ........................ 252/301.35 |

*Primary Examiner*—C. Melissa Koslow
*Attorney, Agent, or Firm*—Seidel, Gonda, Lavorgna & Monaco, PC

[57] ABSTRACT

A fluorescent dye composition for inclusion in a fluid for leak detection applications is provided which is responsive to a broad range of UVA, blue, and UVA-blue light sources. The composition comprises a mixture of a perylene dye, a naphthalimide dye, and a hydrocarbon-based fluid, wherein the combination of the perylene dye, the naphthalimide dye and the hydrocarbon-based fluid are miscible in the fluid. A fluorescent dye composition is also provided that is effective for all automotive working fluids, including heavy lubricants and transmission fluids, synthetic lubricants and internal combustion oils, refrigerants, liquid and gaseous fuels, and hydraulic fluids. A fluorescent dye composition is also provided containing only a combination of perylene dye and naphthalimide dye.

19 Claims, 4 Drawing Sheets

FULL SPECTRUM DYE ABSORTION PROFILE

FULL SPECTRUM FLUORESCENT DYE COMPOSITION FOR THE OPTIMIZATION OF LEAK DETECTION PROCESSES

This application claims priority to previously filed U.S. Provisional Patent Application Ser. No. 60/057,110 filed Aug. 27, 1997.

FIELD OF THE INVENTION

This invention relates, generally, to the field of leak detection by illumination of fluorescent material, and more particularly to fluorescent dye compositions utilized in leak detection.

BACKGROUND OF THE INVENTION

Fluorescent additives provide an excellent leak detection technique for determining the site of leakage of an operating fluid from a working system. Operating fluids such as lubricants, hydraulic fluids, heat transfer fluids, and refrigerants are treated with a dye additive which fluoresces when illuminated by suitable ultraviolet or visible blue light.

Fluorescence is generally understood to be a property that enables certain materials to absorb light energy and radiate visible light at a longer wavelength than the absorbed light. According to generally accepted theory, electrons in fluorescent materials are excited upon being illuminated by light energy of a specific wavelength, and light energy of a longer wavelength is radiated from these materials as the electrons return to the unexcited or ground state. The specific excitation and radiation wavelengths are characteristics of the particular fluorescent materials. The apparent brightness of a fluorescent material's luminescence is dependent on the wavelength emitted by the material and the intensity of the incident radiation that excites the material. For example, a fluorescent dye which has its excitation peak at a specific wavelength may quickly emit a much reduced luminescence as the wavelength of incident light deviates from the excitation peak, and will lose the ability to fluoresce when the incident light does not have enough energy within the specific excitation range.

The visibility of the fluorescent response is much increased when the intensity of other visible light is reduced, so that the fluorescent response is not masked or washed-out by other light. Thus, ultraviolet/blue leak detection lamps directed in otherwise dark conditions at an operating system containing a UV/blue responsive fluorescent dye will reveal leak sites which glow against the dark background.

The most common UV/blue fluorescent leak detection dyes used today are either perylene-based fluorescent compounds or naphthalimide-based fluorescent compounds. Perylene dyes produce an intense yellow fluorescent response when exposed to incident radiation in a band of the electromagnetic spectrum which includes the long wave ultraviolet (UV-A) wavelength range of about 315 nm to about 400 nm, with a strong peak between about 340 to 375 nm. Long-wave ultraviolet is also referred to as "black light", as it includes a small segment of the visual violet range. Naphthalimide dyes fluoresce a brilliant green when exposed to incident radiation of visible violet/blue light. The visible violet/blue range extends from about 400 nm to about 480 nm within the electromagnetic spectrum. Both perylene and naphthalimide dyes are useful for leak detection in oil-based working fluids or fluids in which oil is miscible.

The various inspection lamps used to illuminate the exterior of the fluid-containing portions of the operating systems can be grouped by emission wavelength into three general types: (a) UV filter (see FIG. 1), (b) UV/BLUE glass filter (FIG. 2) and (3) broad spectrum UV to blue thin film filters (FIG. 3).

The UV filter lamps emit long wave ultraviolet light which provides optimal energy for use with the perylene dyes. These high intensity/ narrow band UV lamps will also emit enough energy in the naphthalimide dyes' broader excitation band to produce a fluorescent response. However, these high intensity lamps tend to be larger than those used to provide visible light and can be cumbersome in situations where working space is very limited.

The lower intensity lamps with UV/BLUE glass filters provide visible violet/blue illumination are optimally suited for use with the naphthalimide dyes, whose excitation peak lies within this wavelength band. These lamps may cause the perylene dyes to fluoresce, though only poorly. These lamps are also typically less expensive and more compact than high intensity lamps.

The third type is the relatively new broad spectrum lamps which use thin film filters to pass a substantial amount of visible violet to blue light as well as long wave ultraviolet light. These lamps are the most versatile, as they can be used effectively with both perylene and naphthalimide fluorescent dyes, and can provide intense illumination even in compact form. Being relatively new, however, there are fewer of these lamps in use than the other types.

The sensitivity of the human eye to low Intensity light is greatest for wavelengths between about 540–570 nm (yellow green). Perylene dyes emit an intense, but narrow band, fluorescent response, which has a main intensity peak between about 520 and 550, and a smaller peak between about 560 to 580. Thus, the color of the perylene fluorescent response is close to that wavelength range which the human eye is most sensitive, and the perylene dyes exhibit a more intense fluorescence than that of the naphthalimide dyes. Under ideal conditions in clean, clear fluids, perylene dyes provide a superior fluorescence to that of naphthalimides.

However, what the leak inspector sees is the combination of the fluorescence of the dye and any natural fluorescence of the fluid. This combination may "wash out" the apparent brightness. Many of the lubricants to which fluorescent leak detection dyes are applied have some natural fluorescent response to UV/visible blue light energy. These fluids may also have a color or may be tainted with contaminants which can mask the fluorescent response of the leak detection dye. The combination of a natural fluorescence from host fluids, and the presence of contaminants (such as dirt or combustion residue) may mask the fluorescent response of a perylene dye.

Naphthalimide dyes emit a broad fluorescent response with an intensity peak between about 480–520 nm. The naphthalimide dyes do not fluoresce as brilliantly as the perylenes, but the green fluorescence of a naphthalimide dye will not be as noticeably diminished by the natural fluorescence of a host fluid.

The majority of fluorescent leak detection dyes presently being marketed for use in oil-based working fluids, or in fluids in which oil is soluble, employ perylene-based dye materials. These dyes are applied in lubricating systems, fuel systems, transmission fluids, and hydraulic fluids. Naphthalimide dyes are primarily used in applications within some air conditioning and refrigeration systems where polyolester or polyalkylene glycol-based lubricants are used with R-134a or similar refrigerant.

Typical automotive fluids encompass a wide range of physical properties and include air conditioning refrigerant, engine lubricating oil, transmission fluid, brake fluid, power steering fluid, radiator coolant, diesel oil, and gasoline. In an auto repair facility, where diagnostic leak detection using fluorescent dyes is commonly performed on both air conditioning and other fluid systems, there is generally only one inspection lamp available for leak detection purposes. This light source may not be optimally, or even altogether, effective on the dye in the target fluid.

It would be desirable to have a fluorescent dye for the various types of working fluids which is effective when used with any of the available inspection lamps. It would also be desirable to have a dye which is effective in all automotive working fluids.

Thus, one objective of this invention is to create blended dye compositions of perylene and naphthalimide dye in various proportions to create effective dyes for particular fluids with a substantial fluorescent response to illumination by the entire range of inspection lamps. Another objective is to create a single all-purpose blend that is satisfactory for all automotive fluids and all inspection lamps.

SUMMARY OF THE INVENTION

In its general aspect, the invention is a fluorescent dye composition for leak detection of working fluids, the composition comprising a mixture of a perylene dye, a naphthalimide dye, and a hydrocarbon, wherein the combination of the perylene dye, the naphthalimide dye and the hydrocarbon are miscible in the working fluids.

In its more restricted aspects, the invention is a fluorescent dye composition tailored to the physical and chemical properties of a working fluid.

In another aspect, the invention is a fluorescent dye composition effective for all automotive working fluids, including heavy lubricants and transmission fluids, synthetic lubricants and internal combustion oils, refrigerants, liquid and gaseous fuels, and hydraulic fluids.

DETAILED DESCRIPTION OF THE INVENTION

Figure 1:
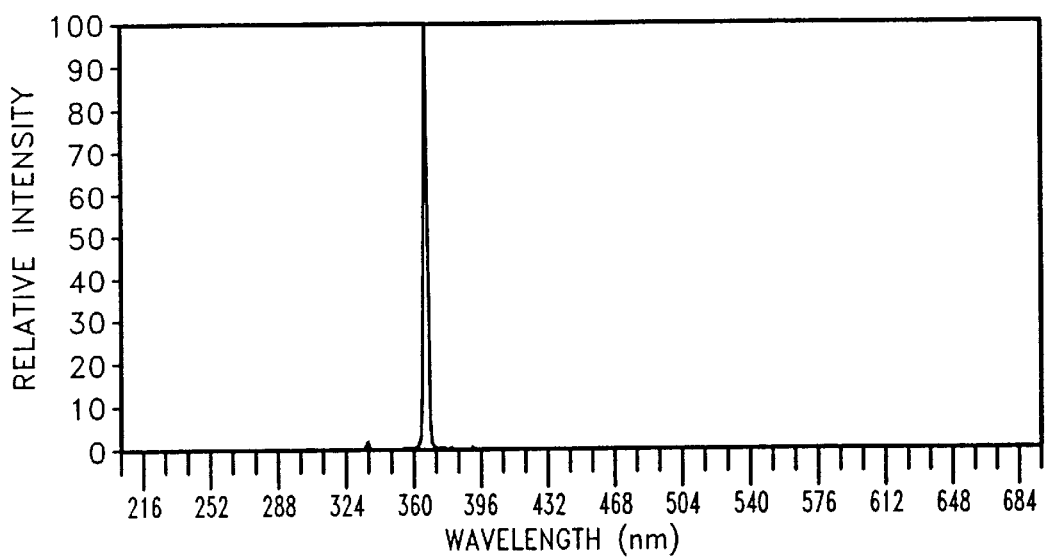
FIG. 1 is a transmission curve of a high intensity narrow band UVA light source.
Figure 2:
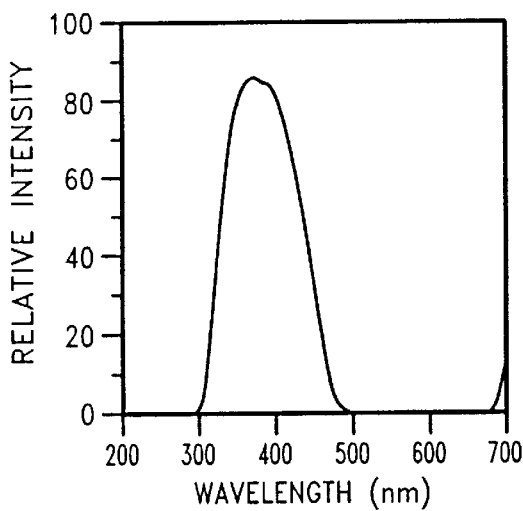
FIG. 2 is a transmission curve of a UV/visible blue light source.
Figure 3:
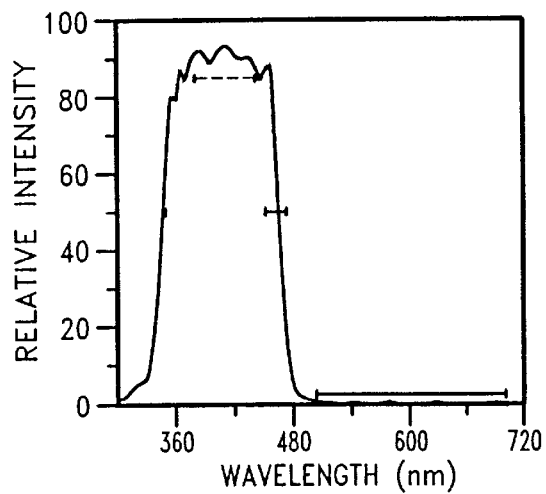
FIG. 3 is a transmission curve of a UV/visible blue light source containing a thin-film coating filter.

FIGS. 1 through 3 show the irradiance output of the three common types of UV/BLUE inspection lamps commonly used in leak detection. FIG. 1 shows the transmission spectra characteristic of a high intensity UV light source having a UVA filter. This lamp produces an intense output essentially restricted to a narrow band between 330 nm and 390 nm. FIG. 2 shows the characteristic transmission curve from a lamp having a broad UV/blue glass filter. Here, a lower intensity light is spread over a broader wavelength range of between about 350 nm and about 510 nm, with a peak intensity at about 420 nm. FIG. 3 shows a transmission curve characteristic of another type of UV/blue lamp which uses thin-film coating technology to construct a filter which passes a broader band of relatively uniform intensity between about 320 nm and 148 nm.

Figure 4:
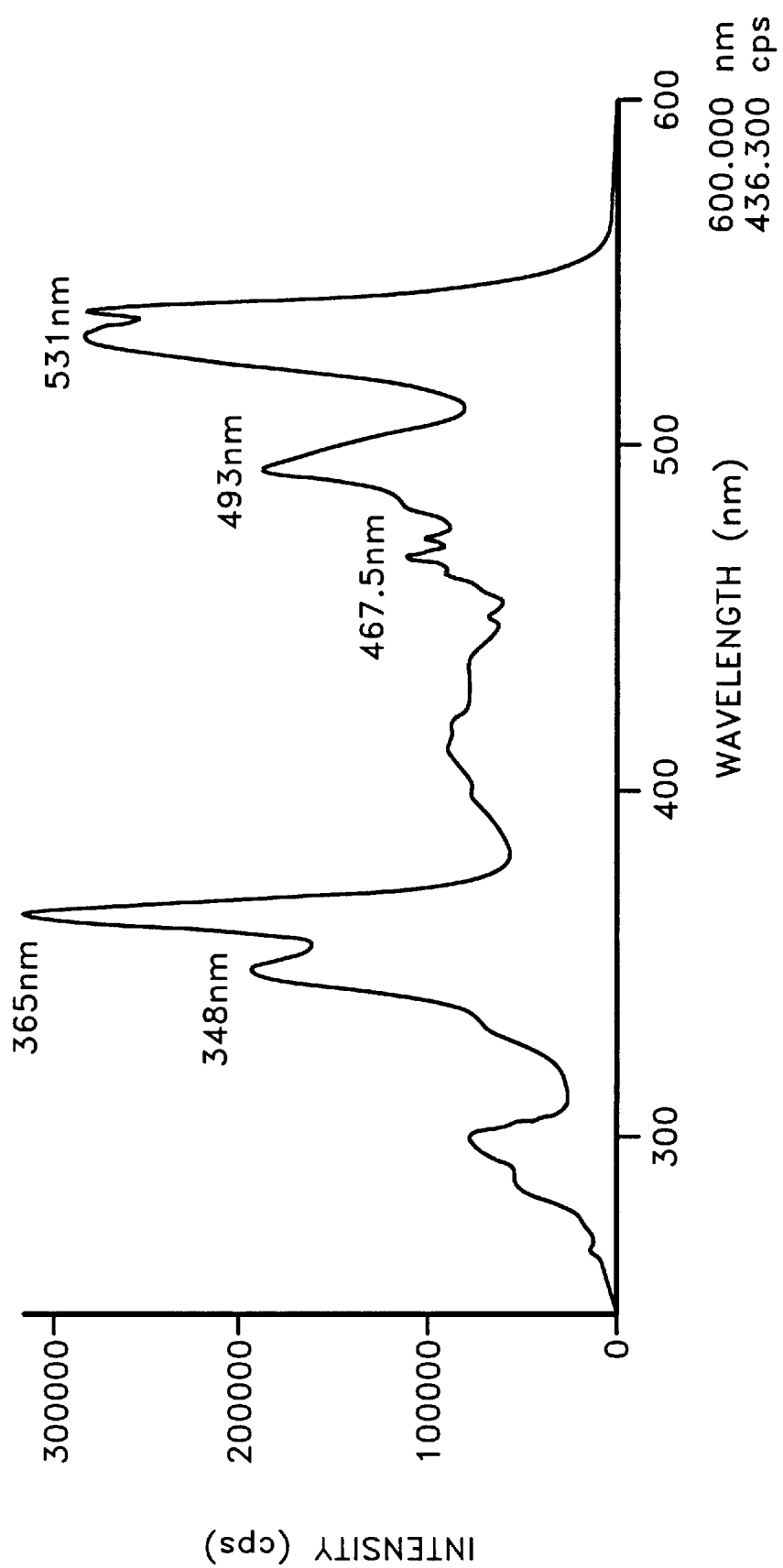
FIG. 4 is an excitation spectra profile for a perylene dye.

FIG. 4 shows the excitation spectra of a fluorescent perylene dye in the UV and visible spectrum. As used herein, the term "perylene dye" refers to the class of water-insoluble organic dyes that includes perylene and substituted perylene. The perylene dye shows good excitation in the long wave ultraviolet (UV-A) wavelength range, with a strong peak between about 340 to 375 nm. The dye also shows moderate excitation in the visible blue region, and another excitation peak at around 530 nm.

Perylene-based fluorescent additives exhibit optimal fluorescent properties when illuminated by a high-intensity narrow band UVA lamp (as exemplified by the lamp of FIG. 1). The high intensity of radiation at around 365 nm which is characteristic of these lamps falls right at the primary excitation peak of the perylene dye. Perylene-based fluorescent additives may also be excited (and hence fluoresce) by broader spectrum light sources, though to a lesser degree.

Figure 5:
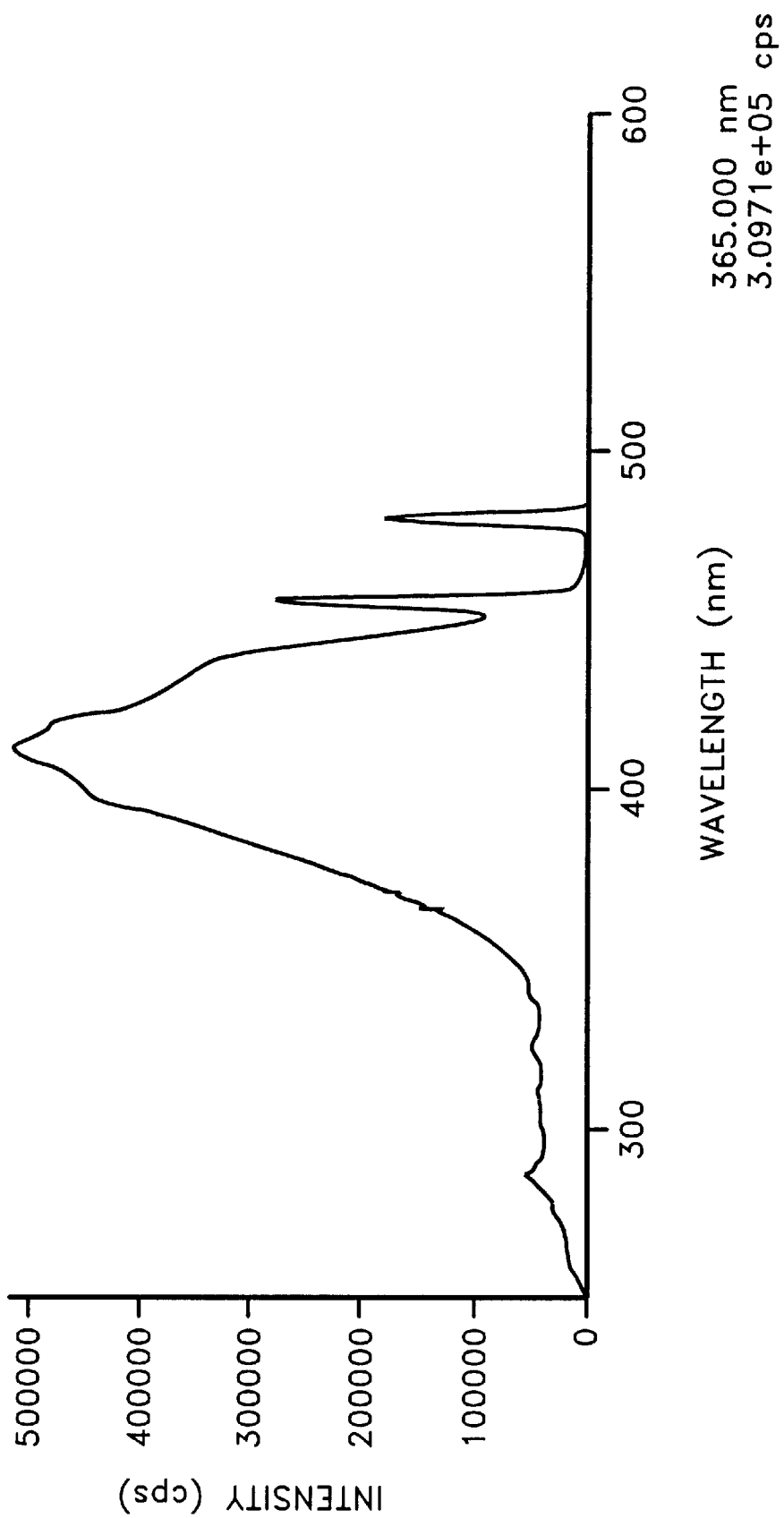
FIG. 5 is an excitation spectra profile for a naphthalimide dye.

FIG. 5 shows the excitation spectra of a fluorescent naphthalimide dye in the UV and visible spectrum. As used herein, the term "naphthalimide dye" refers to the class of water-insoluble organic dyes that includes naphthalimide and substituted naphthalimide. The naphthalimide dye exhibits a broad excitation band in the violet-blue region, with a peak at about 410 nm. The characteristic excitation spectra of the naphthalimides explains why the high intensity UV lamps are not as effective in illuminating these dyes. The high intensity UV lamps indicate little or no light above 400 nm at the peak excitation band of the naphthalimides.

Combinations of both perylene and naphthalimides dyes, blended in proportions as set forth in this description, are effective to the full range of excitation available from filtered long wave ultraviolet light or visible blue light sources. The resulting mixtures are a multipurpose, full spectrum dye having the benefits of each of its constituent components for different types of working fluids.

Figure 6:
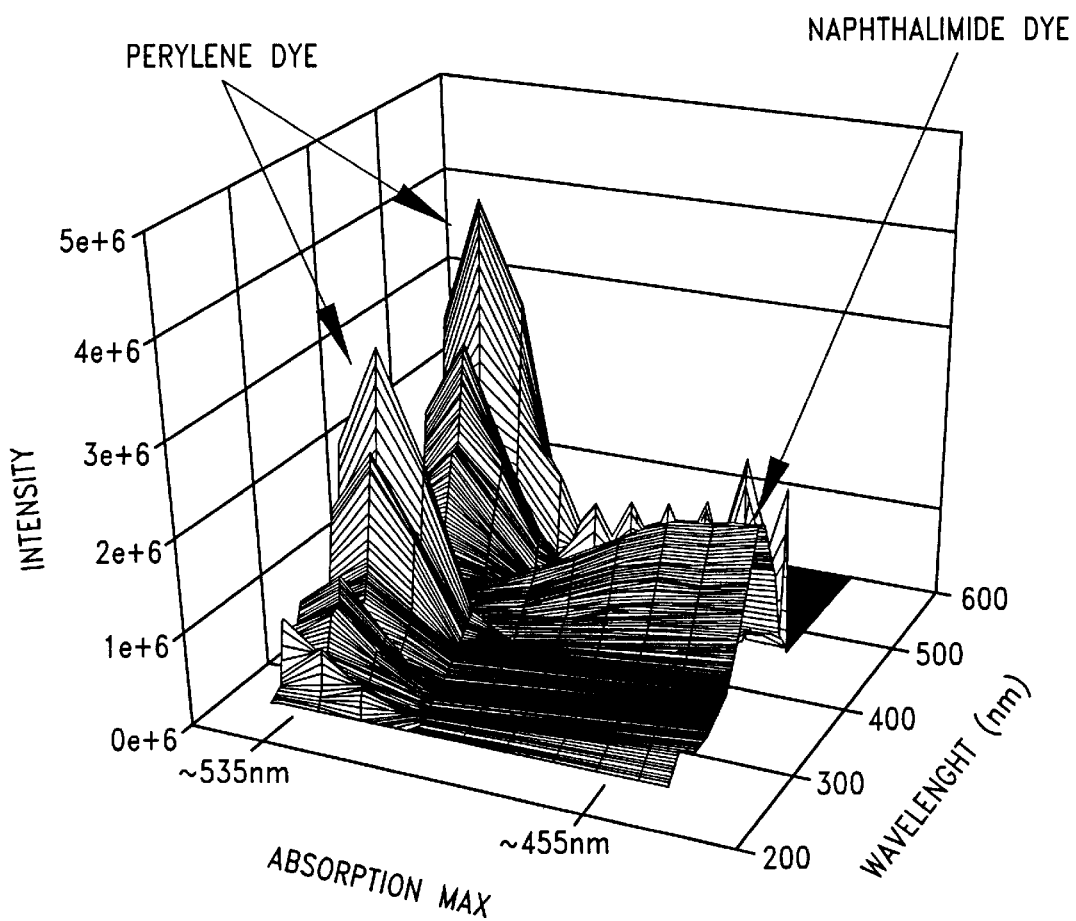
FIG. 6 is an excitation spectra profile for a combined perylene dye/naphthalimide dye composition.

FIG. 6 shows an excitation spectra profile for a combined perylene dye/naphthalimide dye composition. As can be seen in the Figure, such a dye combination has multiple excitation peaks, including peaks at about 345 nm, 360 nm, 410 nm, 490 nm, and 535 nm.

Solvent effects with the carrier fluid may account for shifts in the excitation spectra. FIG. 6 illustrates the versatility and responsiveness of a combination dye to all of the available light sources—UVA, Blue, and UVA-Blue. It is shown in FIG. 6 that the two dyes complement each other in that the absence of a fluorescent response in one is supplemented by the response of the other.

The perylene and naphthalimides dyes are blended with a carrier fluid, which is a liquid in which oil is miscible, to make the dye compositions of the present invention. The carrier fluid is a hydrocarbon-based fluid. "Hydrocarbon-based fluid" is understood to refer to fluids substantially containing hydrocarbon constituents, but may further contain substituted hydrocarbons or non-hydrocarbon additives. Typical carrier fluids include, for example, a paraffinic or naphthenic mineral oil, a polyalkylene glycol, a polyolester, or an alkyl benzene, depending upon the particular working fluid.

The relative concentrations of perylene and naphthalimide dye, as well as the carrier liquid, are generally dependent on the target fluid to which the dye mixture will be introduced. In fluids where there is little natural fluorescence of the target fluid and a low likelihood of contamination, such as liquid or gaseous fuels or hydraulic fluids, the perylene dye is used in significantly larger proportion than that of the naphthalimide dye. Liquid fuels include, for example, kerosene and the variety of grades of gasoline and diesel fuels. Gaseous fuels include, for example, propane (which is initially delivered as a liquid under pressure) or natural gas. Hydraulic fluids are defined as fluids based on paraffinic and cycloparaffinic petroleum fractions, with additives that improve wear, viscosity or flame resistance.

An example of an appropriate leak detection dye composition for working fluids with little or no natural fluorescence has a volumetric ratio of perylene to naphthalimide in the range from about 20:1 to about 2.3:1, most preferably about 4:1. The resulting greater contribution of the perylene to the naphthalimide in the fluorescent response will result in an increase in brilliance and viability for superior leak detection. The naphthalimide dye, though added in a smaller proportion, provides sufficient fluorescent intensity if the target is illuminated with a UV/blue lamp instead of a high intensity UV lamp.

In fluids that exhibit some interfering natural fluorescence and where some contamination is typical, such as in some heavier weight lubricants, synthetic lubricants and internal combustion engine oils, the perylene dye would still be used in larger proportion than the naphthalimide dye, but to a lesser degree. Synthetic lubricants, for example, include silicone oils, polyglycol (hydraulic and brake fluids), polyphenyl ethers (high temperature resistance), silicates (aircraft hydraulics), phosphate esters (such as tricresyl phosphate, for fire resistance), neopentyl polyolesters (turbine engines), and synthetic hydrocarbons. Internal combustion engine oils include commercially available motor oils (e.g., 10W-30 grade) and gear lubricating oils. In such a case, a leak detection dye may be formulated having a volumetric ratio of perylene to naphthalimide in the range from about 4:1 to about 1.5:1, most preferably 2.3:1. The green fluorescence of the naphthalimide component overcomes the blue hue of the naturally fluorescent working fluid which would otherwise interfere with the perylene dye.

In very dark and heavy fluids where there is intense natural fluorescence, or where contaminants are typical, such as in some heavy weight lubricants and transmission fluids, the perylene dye is used in about equal proportions to that of the naphthalimide dye. Heavy weight lubricants are petroleum-derived lubricating oils having greater specific gravities than lighter weight lubricants, as well as greater viscosities for turbine, aircraft, or gear applications. Transmission fluids are petroleum-derived lubricating oils and generally contain a variety of additives to inhibit oxidation and rusting, improve viscosity, and promote wear. In this case, an example of a dye mixture consists of a leak detection dye having a volumetric ratio of perylene to naphthalimide from about 1.5:1 to about 0.5:1, most preferably 1:1. The green fluorescence of the naphthalimide component would overcome the natural blue fluorescence of the target fluid or the adverse affects on the fluorescence of the perylene attributed to contaminants.

A dye mixture may also be formulated to be universally applicable for all of the above described applications. This universal dye has a volumetric ratio of perylene to naphthalimide in the range from about 2.33:1 to about 1.5:1, most preferably 1.86:1. In such case, a single fluorescent dye mixture would be effective in all working fluids and under all inspections lamps.

Refrigeration systems present a unique set of design parameters for a leak detection dye mixture. The carrier fluid that is used to deliver the fluorescent dye mixture is generally chosen to be the same material the refrigeration system employs as the system lubricant. Refrigeration systems utilizing CFC or HCFC refrigerants use mineral oil, polyolester, or alkyl benzene lubricants. HFC refrigerants generally require a polyalkylene glycol or polyolester lubricants. Blended refrigerants can use any of these oils, depending on the characteristics of the blend's constituents.

The present invention contemplates that a leak detection dye mixture for a refrigeration system utilizing HFC fluids (such as R-134a) containing polyalkylene glycol as a system lubricant contains naphthalimide and perylene dyes having a volumetric ratio of naphthalimide to perylene in the range from about 19:1 to about 5.7:1, most preferably about 9:1.

For refrigerant fluids using a polyolester as the system lubricant, the fluorescent dye mixture contains naphthalimide to perylene in the range from about 5.7:1 to about 1.5:1, most preferably about 2.3:1 (volumetric ratios).

In preparing the dye mixtures of the present invention, the perylene, naphthalimide, and carrier fluid components are blended in a low-shear mixing fashion. The amount of carrier fluid to which the dye components is added is determined by the desired volume of the final composition. A desirable volume of dye composition to be added to a working fluid may be one-quarter ounce. This quantity is sufficient to carry the dye product without adding an excessive amount of extra fluid to a working system.

The dye mixtures of the present invention may be prepared for inclusion in a working fluid in powdered form without a carrier fluid. The volumetric ratio of the dye components is unchanged in such cases.

It is further understood that the present invention is not limited to the particular embodiments shown and described herein, but that various changes and modifications may be made without departing from the scope and spirit of the invention.

What is claimed is:

1. A fluorescent dye composition for inclusion in a working fluid for detecting sites of fluid leakage, the composition comprising a mixture of a perylene dye, a naphthalimide dye, and a hydrocarbon-based fluid, wherein the combination of the perylene dye, the naphthalimide dye and the hydrocarbon-based fluid are miscible in the working fluid, the working fluid being selected from the group consisting of heavy lubricants and transmission fluids and the volumetric ratio of the perylene dye to the naphthalimide dye in the composition is in the range from about 1.5:1 to about 0.5:1.

2. A fluorescent dye composition as in claim 1, wherein the hydrocarbon-based fluid is an oil-based mixture.

3. A fluorescent dye composition as in claim 1, wherein the hydrocarbon-based fluid is selected from the group consisting of a paraffinic mineral oil, a naphthenic mineral oil, a polyalkylene glycol, a polyolester, and an alkyl benzene.

4. A fluorescent dye composition for inclusion in a working fluid for detecting sites of fluid leakage, the composition comprising a mixture of a perylene dye, a naphthalimide dye, and a hydrocarbon-based fluid, wherein the combination of the perylene dye, the naphthalimide dye and the hydrocarbon-based fluid are miscible in the fluid, the working fluid being selected from the group consisting of synthetic lubricants and internal combustion oils and the volumetric ratio of the perylene dye to the naphthalimide dye in the composition is in the range from about 4:1 to about 1.5:1.

5. A fluorescent dye composition as in claim 4, wherein the hydrocarbon-based fluid is an oil-based mixture.

6. A fluorescent dye composition as in claim 4, wherein the hydrocarbon-based fluid is selected from the group consisting of a paraffinic mineral oil, a naphthenic mineral oil, a polyalkylene glycol, a polyolester, and an alkyl benzene.

7. A fluorescent dye composition for inclusion in a working fluid for detecting sites of fluid leakage, the composition comprising a mixture of a perylene dye, a naphthalimide dye, and a hydrocarbon-based fluid, wherein the combination the perylene dye, the naphthalimide dye and the hydrocarbon-based fluid are miscible in the fluid, the working fluid being selected from the group consisting of liquid fuels, gaseous fuels, and hydraulic fluids and the volumetric ratio of the perylene dye to the naphthalimide dye in the composition is in the range from about 20:1 to about 2.3:1.

8. A fluorescent dye composition as in claim 7, wherein the hydrocarbon-based fluid is an oil-based mixture.

9. A fluorescent dye composition as in claim 7, wherein the hydrocarbon-based fluid is selected from the group consisting of a paraffinic mineral oil, a naphthenic mineral oil, a polyalkylene glycol, a polyolester, and an alkyl benzene.

10. A fluorescent dye composition for inclusion in a working fluid for detecting sites of fluid leakage the composition comprising a mixture of a perylene dye, a naphthalimide dye, and a hydrocarbon-based fluid, wherein the combination of the perylene dye, the naphthalimide dye and the hydrocarbon-based fluid are miscible in the working fluid, and the volumetric ratio of the perylene dye to the naphthalimide dye in the composition is in the range from about 3:1 to about 1.5:1.

11. A fluorescent dye composition as in claim 10, wherein the hydrocarbon-based fluid is an oil-based mixture.

12. A fluorescent dye composition as in claim 10, wherein the hydrocarbon-based fluid is selected from the group consisting of a paraffinic mineral oil, a naphthenic mineral oil, a polyalkylene glycol, a polyolester, and an alkyl benzene.

13. A fluorescent dye composition for inclusion in a fluid used as a refrigerant, the composition comprising a mixture of a perylene dye, a naphthalimide dye, and a hydrocarbon-based fluid, wherein the combination of the perylene dye, the naphthalimide dye and the hydrocarbon-based fluid are miscible in the refrigerant, and the hydrocarbon-based fluid is a polyalkylene glycol and the volumetric ratio of the naphthalimide dye to the perylene dye in the composition is in the range from about 19:1 to about 5.7:1.

14. A fluorescent dye composition for inclusion in a fluid used as a refrigerant, the composition comprising a mixture of a perylene dye, a naphthalimide dye, and a hydrocarbon-based fluid, wherein the combination of the perylene dye, the naphthalimide dye and the hydrocarbon-based fluid are miscible in the refrigerant, and the hydrocarbon-based fluid is a polyolester and the volumetric ratio of the naphthalimide dye to the perylene dye in the composition is in the range from about 5.7:1 to about 1.5:1.

15. A fluorescent dye composition for inclusion in a fluid for leak detection applications, the composition comprising a mixture of a perylene dye and a naphthalimide dye, wherein the combination of the perylene dye and the naphthalimide dye are miscible in the fluid, and the fluid is selected from the group consisting of heavy lubricants and transmission fluids and the volumetric ratio of the perylene dye to the naphthalimide dye in the composition is in the range from about 1.5:1 to about 0.5:1.

16. A fluorescent dye composition for inclusion in a fluid for leak detection applications, the composition comprising a mixture of a perylene dye and a naphthalimide dye, wherein the combination of the perylene dye and the naphthalimide dye are miscible in the fluid, and the fluid is selected from the group consisting of synthetic lubricants and internal combustion oils, the volumetric ratio of the perylene dye to the naphthalimide dye in the composition is in the range from about 4:1 to about 1.5:1.

17. A fluorescent dye composition for inclusion in a fluid for leak detection applications, the composition comprising a mixture of a perylene dye and a naphthalimide dye, wherein the combination of the perylene dye and the naphthalimide dye are miscible in the fluid, and the fluid is selected from the group consisting of liquid fuels, gaseous fuels, and hydraulic fluids and the volumetric ratio of the perylene dye to the naphthalimide dye in the composition is in the range from about 20:1 to about 2.3:1.

18. A fluorescent dye composition for inclusion in a fluid for leak detection applications, the composition comprising a mixture of a perylene dye and a naphthalimide dye, wherein the combination of the perylene dye and the naphthalimide dye are miscible in the fluid, and the fluid is a refrigerant that employs a polyalkylene glycol as a system lubricant and the volumetric ratio of the naphthalimide dye to the perylene dye in the composition is in the range from about 19:1 to about 5.7:1.

19. A fluorescent dye composition for inclusion in a fluid for leak detection applications, th e composition comprising a mixture of a perylene dye and a naphthalimide dye, wherein the combination of the perylene and the naphthalimide dye are miscible in the fluid, and the fluid is a refrigerant that employs a polyolester as a system lubricant and the volumetric ratio of the naphthalimide dye to the perylene dye in the composition is in the range from about 5.7:1 to about 1.5:1.

* * * * *